United States Patent [19]
Kino et al.

[11] Patent Number: 5,194,918
[45] Date of Patent: Mar. 16, 1993

[54] METHOD OF PROVIDING IMAGES OF SURFACES WITH A CORRELATION MICROSCOPE BY TRANSFORMING INTERFERENCE SIGNALS

[75] Inventors: Gordon S. Kino; Stanley S. C. Chim, both of Santa Clara County, Calif.

[73] Assignee: The Board of Trustees of the Leland Stanford Junior University, Stanford, Calif.

[21] Appl. No.: 700,525

[22] Filed: May 14, 1991

[51] Int. Cl.$^5$ .................................. G01B 11/24
[52] U.S. Cl. ................................ 356/359; 356/360; 382/43
[58] Field of Search ............... 356/359, 360, 124, 125, 356/351, 356; 382/43

[56] References Cited

U.S. PATENT DOCUMENTS 4,854,708  8/1989  Kafri et al. .......................... 356/359
5,018,861  5/1991  Remo ................................. 356/351

Primary Examiner—Davis L. Willis
Assistant Examiner—LaCharles P. Keesee, II
Attorney, Agent, or Firm—Flehr, Hohbach, Test, Albritton & Herbert

[57] ABSTRACT

A method of processing the interference signals form a correlation microscope to provide images of a surface being examined. The interference signals for a plurality of x,y locations at a plurality of z positions are transformed to provide an intensity envelope of the signals along the z axis for each x,y location. The intensity envelope can then be processed to provide desired images.

9 Claims, 7 Drawing Sheets

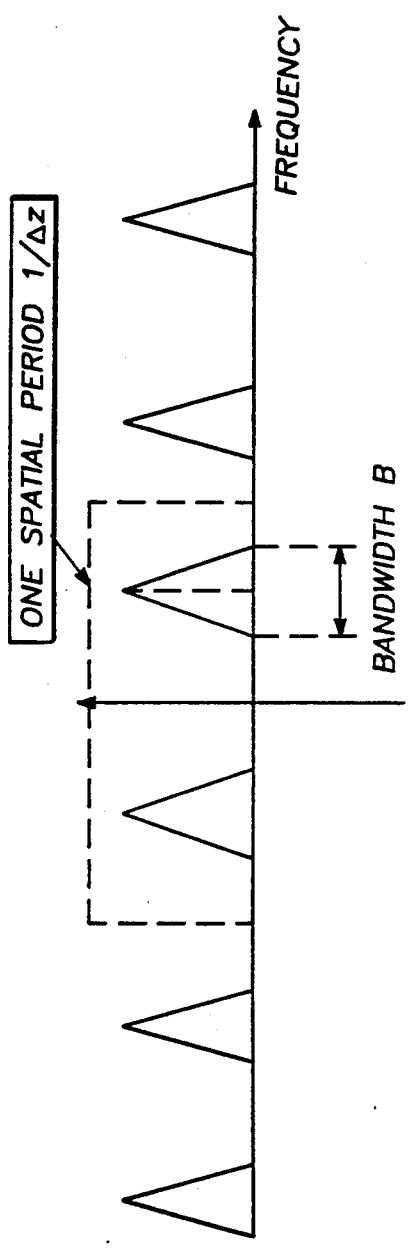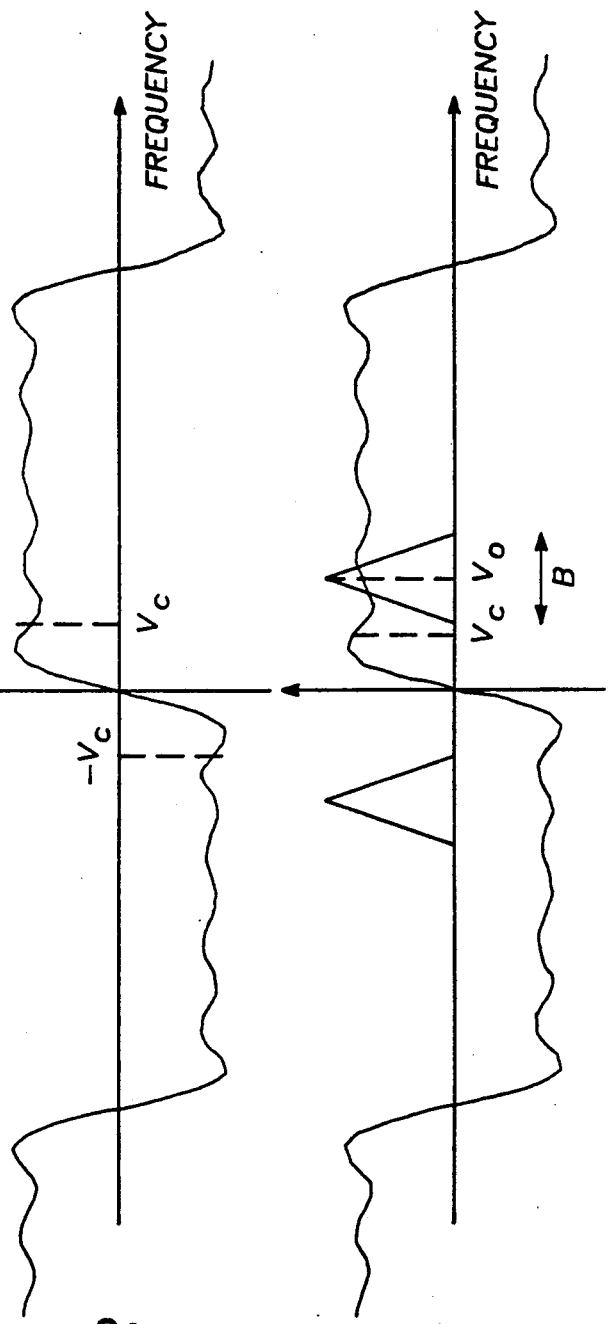
FIG.—11
FIG.—12
FIG.—13

PHASE IMAGE

METHOD OF PROVIDING IMAGES OF SURFACES WITH A CORRELATION MICROSCOPE BY TRANSFORMING INTERFERENCE SIGNALS

CROSS-REFERENCE TO RELATED APPLICATION

This application is a continuation-in-part of copending U.S. patent application Ser. No. 07/419,521, filed Oct. 4, 1989, entitled CORRELATION MICROSCOPE, which is incorporated herein by reference.

BRIEF DESCRIPTION OF THE INVENTION

This invention relates generally to a method of providing images of surfaces using a correlation microscope and more particularly to a method employing signal transformation such as by Fourier or Hilbert transform.

BACKGROUND OF THE INVENTION

FIG. 1 shows one embodiment of the present invention employing an interferometer in accordance with the teaching of said copending application. In said copending application, reference is made to electronic processing of the interference signals obtained from the interference correlation microscope to provide images of the surface Briefly, an interference signal is generated for each x,y position of the surface as the surface is scanned in the z direction.

Unlike a standard microscope or a confocal microscope, the images produced by an interference microscope are extremely hard to interpret due to the presence of bright and dark fringes. The object of this invention is to provide a method of processing the signals to extract useful data from the interference images. There are already some existing algorithms for extracting phase information used by commercial firms. For example, phase shifting techniques are employed by both the Wygo and Zygo Corporations to extract phase data from the interference images. By employing such algorithms, surface profiles in the nanometer range have been measured. However, the major difficulty associated with such phase shifting techniques is to get the proper phase shift between the data frames. It is impossible to determine the exact phase shift between data frames with an illumination source that is wider band than a laser source. Another drawback of such algorithms is that they can only be used to measure the surface profiles of opaque objects.

The present invention is directed to a process capable of removing the aliasing or the fringes in the images. This is achieved by filtering the data along the axial axis or the z-axis. Hence, the object is scanned axially along the z-axis by a piezoelectric pusher in equal discrete steps and a CCD camera is synchronized by computer control to acquire an image of the object at each step. The acquired images are then stacked inside the computer for further signal processing. One method for extracting the amplitude and the phase information from the interference images is based on filtering the data in the spatial frequency domain. Each pixel (x,y) in the image plane is Fourier transformed along the z-axis, filtered in the frequency domain and then inverse transformed back to the space domain. This algorithm is powerful because it can produce two-dimensional cross-sectional amplitude and phase images of any objects. However, if the number of pixels in the image is large, this process can be computationally intensive and slow. Consequently, it is mainly reserved for producing line scans in critical dimension measurements.

Another method is based on the Hilbert transform and is a more efficient procedure for obtaining two-dimensional cross-sectional images. The simplicity of the Hilbert filter coefficients allows the filtering to be carried out in the space domain with a frame grabber alone. Since no Fourier transforms are required, the number of computations is greatly reduced. Moreover, since a frame grabber operates on a frame-by-frame basis, a significant amount of computation time can be saved.

OBJECTS AND SUMMARY OF THE INVENTION

It is an object of the present invention to provide an improved method of processing interference signals from a correlation microscope or interferometer to provide an image of the surface of an object being scanned.

It is a further object of the invention to provide a method of processing by transforming the output signals from a correlation microscope to provide an image of the surface of an object being scanned.

It is another object of this invention to provide a correlation microscope in which the interference signals are electronically transformed to provide an intensity envelope of signals for each x,y position when the surface is moved in the z direction.

It is yet another object of this invention to provide a correlation microscope in which the interference signals are electronically transformed to provide the phase information of the reflected signal for each x-y position when the surface is moved in the z-direction.

The foregoing and other objects of the invention are achieved by generating interference signals for a plurality of x,y locations on the surface of an object as the object is moved in the z plane, storing the interference signals and transforming the signals at each of the x,y locations in the z direction to obtain an intensity envelope of interfering signals in the z directions for each x,y position, and processing the intensity envelope to obtain a desired image.

BRIEF DESCRIPTION OF THE DRAWINGS

The foregoing and other objects of the invention will be more clearly understood from the following description when read in conjunction with the accompanying drawings, wherein:

FIG. 11 is the frequency spectrum for a sampling interval Δz;

FIG. 12 is the frequency response of a (2M+1) point Hilbert filter;

FIG. 13 shows the positioning of the signal in the frequency domain;

DESCRIPTION OF A PREFERRED EMBODIMENT

Figure 1:
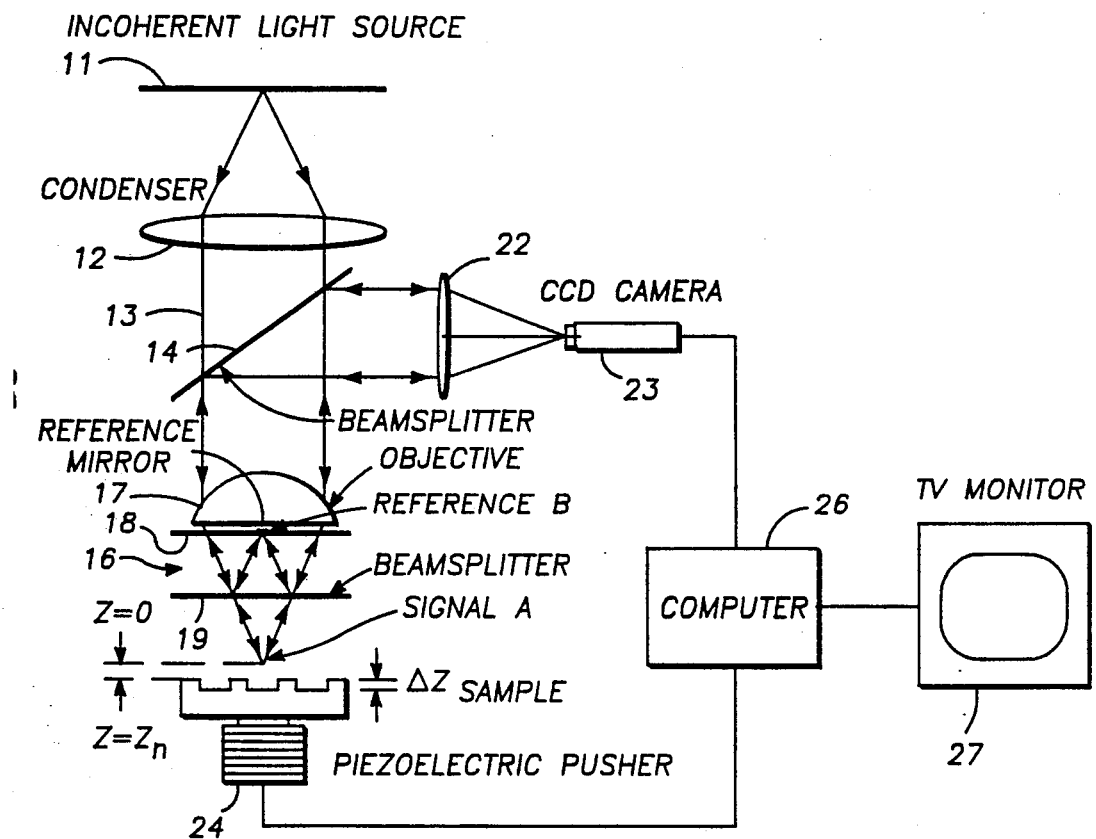
FIG. 1 is a schematic representation of a correlation microscope system in accordance with the invention.

Referring now to FIG. 1, the correlation microscope shown includes a light source 11, preferably a spatially and temporally incoherent broadband light source. The light from a point on the source is captured by condenser lens 12, which forms a collimated beam 13 which passes through beam splitter 14 and to a lens and pellicle assembly 16 including an objective lens 17 and pellicles 18 and 19. The pellicle 18 supports a small mirror (not shown) and the pellicle 19 serves as a beam splitter reflecting approximately 50% of the optical energy impinging thereon and transmitting the other 50%. The transmitted light is focused on the sample object 21. The light reflected from the beam splitter pellicle 19 is focused on the mirror where it is reflected back toward the pellicle 19 and correlates with the light reflected from the sample. The light reflected from the object and the mirror is collected by the objective lens 17 and deflected by the beam splitter 14 to a lens 22 where it is focused onto a CCD camera 23 which provides a video image of the correlated signals from each x,y position. The reference mirror is always kept at the focal plane of the objective while the object, which is located at the object plane, is scanned axially along the vertical axis (z-axis) in equal vertical steps by a computer-controlled piezoelectric pusher 24. CCD camera 23 detects the interfering signals from the reference mirror (signal B) and that from the object (signal A). Images of the interfering signals are acquired by frame grabber electronics which convert the video signals to digital signals for each x,y position and stacks them in computer memory as the object is scanned through equally-spaced vertical steps. Each image made up of multiple x,y positions or pixels corresponds to an individual object plane perpendicular to the axis of the microscope. Due to aliasing, these interference images are extremely hard to interpret and are generally not useful without digital processing. The signals processed by the computer 26 are displayed on monitor 27.

The output current I from the detector CCD for each pixel is of the form:

$$I_{(x,y,z)} = A^2(x,y) + B^2 + A(x,y)B\gamma(x,y,z-z_0) \quad (1)$$

where z is the distance of the reflecting point from the focus, and $z_0$ is the distance of the reference mirror from the focus, while $\gamma(z)$ is the auto-correlation function for the broadband spatially incoherent light source. The detected signal is electronically processed to keep only the product term and the envelope of $\gamma(z)$. The auto-correlation function $\gamma(z)$ is controlled by both the spatial and temporal coherence of the source.

Figure 3:
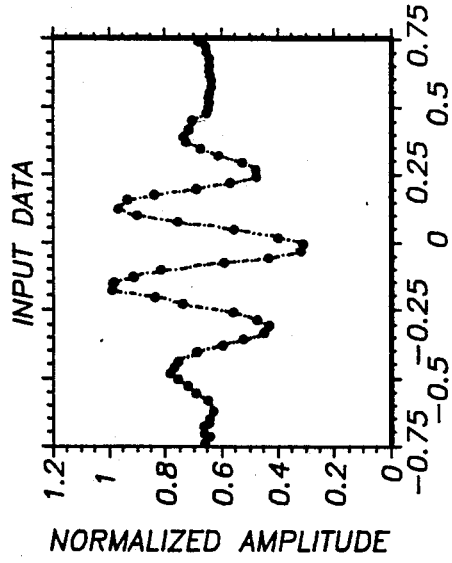
FIG. 3 shows a normalized interference signal for one x,y location.
Figure 4:
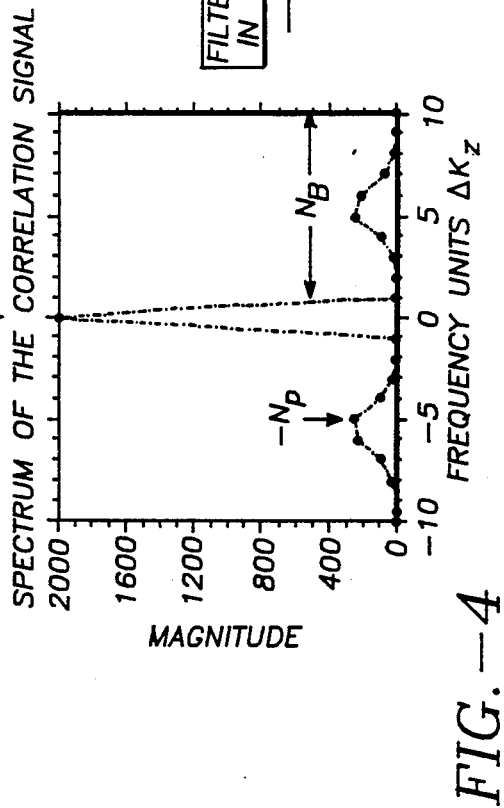
FIG. 4 shows the spectrum of the correlation signal at one pixel as obtained by transformation.
Figure 7:
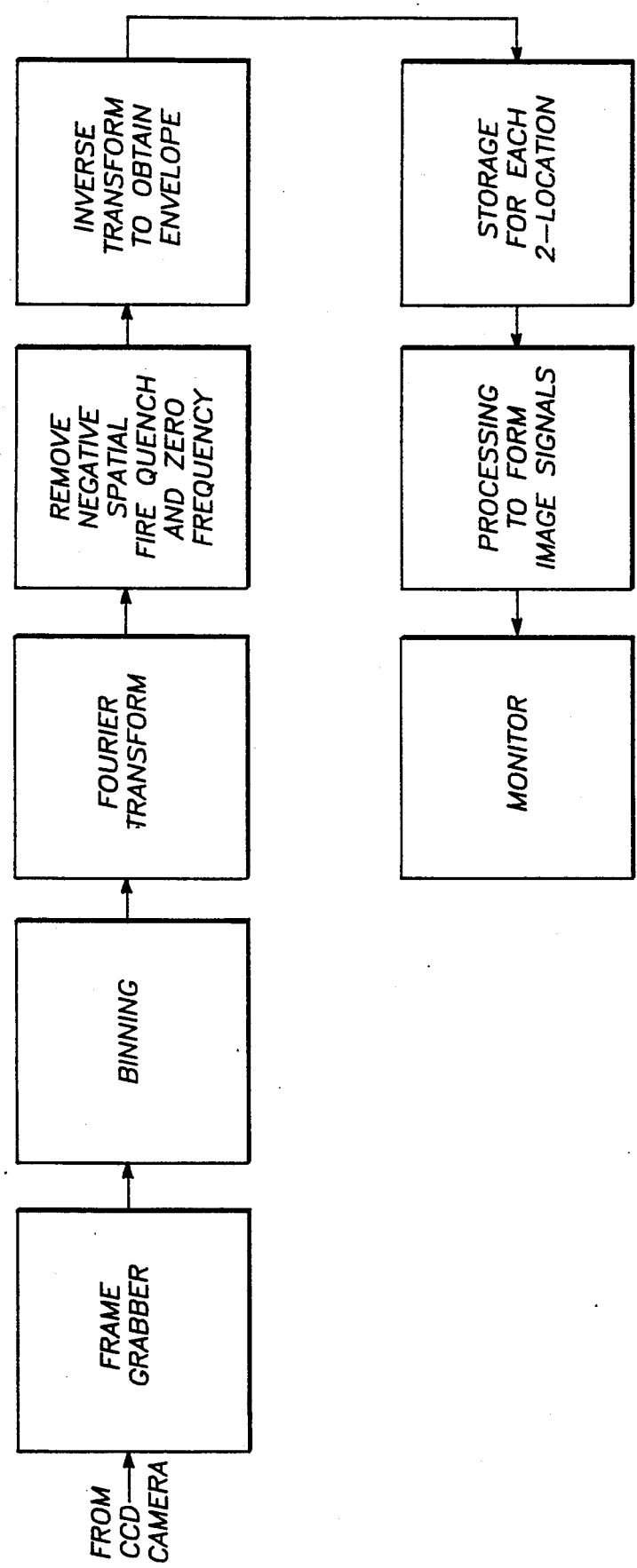
FIG. 7 is a block diagram of a signal processing system for forming and storing interference signal envelopes for processing.

FIG. 3 schematically shows the interference signal output for a pixel having an x,y position at the top and bottom of a step and FIG. 4 shows the normalized amplitude of such a signal. It is apparent that it would be relatively difficult to interpret these signals.

Figure 2:
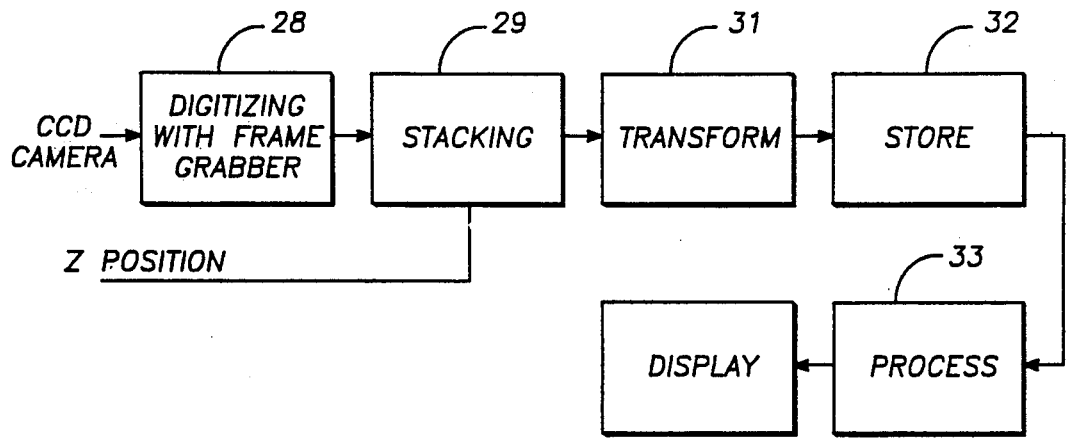
FIG. 2 is a block diagram of a simplified interference signal processing circuit in accordance with the invention.

In accordance with this invention, the video analog signals from the CCD camera are digitized with a frame grabber 28, FIG. 2, for each x,y position for each object plane and stacked in computer memory 29. The digitized signals for each x,y position are then spatially transformed 31 in the z direction to provide an envelope of the interference signal. This envelope is stored in a memory 32 for each x,y,z position where the information can be processed 33 as, for example, by scanning for a fixed value of z a line scan in the y direction can be constructed. It is also possible to provide an x,y image for a fixed value of z or any combination of the above to provide surface images for different z positions. The transformation can be implemented by a Fourier transform or a Hilbert transform.

FOURIER TRANSFORMATION

We first consider the response of the microscope to a planar reflector at a distance z from the focus. Let the incident waveform at the focal plane be u(x,y) and its spatial Fourier transform be:

$$U(k_x, k_y) = \int_{\infty}^{\infty} u(x, y) e^{-j(k_x x + j k_y y)} \, dx \, dy \quad (2)$$

where k is the wave propagation constant, x and y are the pixel position and U(x,y) is the reflected wave Fourier spatial component.

The reflected wave component $U_s(k_x,k_y)$ from the object, which is assumed to be a small distance z from the focal plane, can be written as:

$$U_s(k_x, k_y) = BU(-k_x, -k_y) e^{-j(2k_z z + \phi)} \quad (3)$$

where $\phi$ is the phase change upon reflection from the object. The reflected wave component $U_R(k_x,k_y)$ from the reference mirror at the reference focal plane $z=z_0$ is of the form:

$$U_R(k_x, k_y) = AU(-k_x, -k_y) e^{-2jk_z z_0} \quad (4)$$

where $A(k_x,k_y)$ and $B(k_x,k_y)$ are parameters proportional to the reflection coefficient from the planar object and reference mirror, respectively. We can write in cylindrical coordinates $$k_z = \sqrt{k^2 - k_x^2 - k_y^2} = k\cos\phi, \; k_r = \sqrt{k_x^2 + k_y^2} = k\sin\phi \quad (5)$$

where $\phi$ is the angle of the ray to the axis with a wave of propagation constant $k_r$, $k_z$ propagating along it. It is assumed that $|U(k_x,k_y)|$ is constant for $\theta \leq \theta_0$ and zero for $\theta \geq \theta_0$, where the numerical aperture of the objective is N.A.$=\sin\theta_0$.

The output current from the detector is of the form:

$$\dot{u}(z) = 2\pi \int |U_R + U_S|^2 k_r dk_r = \qquad (6)$$

$$2\pi k^2 |U|^2 \int_0^\theta \{A^2 + B^2 + 2AB\cos[2k(z - z_0) + \phi]\}\sin\theta\cos\theta d\theta$$

We are concerned mainly with the correlation term or product term AB in the integrand. When the illumination is of finite bandwidth with an intensity variation f(k), the correlation term is then given by the relation:

$$I_{AB}^b(z) = 4\pi AB|U|^2 \cdot \qquad (7)$$

$$\int_{bandwidth} \int_0^{\theta_0} k^2 \{\cos[2k(z - z_0)\cos\theta + \phi]\sin\theta\cos\theta d\theta\}F(k)dk$$

where the superscript b stands for broadband.

The Correlation Signal V(z)

The phase difference $\phi$ between the signal and reference beams is $\pi$ since the beamsplitter 19 (FIG. 1) introduces a phase difference $\pi$ into the two beams. The correlation signal $I_{AB}^b(z)$ of the correlation microscope (Eq. 7) is rewritten as:

$$I_{AB}^b(z) = 4\pi AB|U|^2 \int_{bandwidth} \int_0^{\theta_0} \{\cos[2k(z - \qquad (8)$$

$$z_0)]\cos(\theta + \pi)\sin\theta\cos\theta d\theta\} k^2 F(k)dk$$

where F(k) is the intensity spectrum of the illumination source, $\theta_0$ is the angle of the widest angled beam to be collected by the objective, and z is the distance of the surface of the object measured from a fixed frame, such as the front face of the objective. The reference mirror is located at the focal plane where $z=z_0$.

However, it is more convenient to measure the distance of the object from the focal plane of the objective, as illustrated by FIG. 1. If we choose the fixed frame or the origin $z=0$ to be the focal plane of the microscope then $z_0$ is zero. Moreover, if the object is not flat but has a surface profile $\Delta z_{sample}$, the axial distance between the focal plane and any point (x,y) on the surface of the object is $(z+\Delta z_{sample})$. In the simplest case when the object is a mirror, the surface profile $\Delta z_{sample}=0$. Otherwise, $\Delta z_{sample}$ is a function of both x and y. To emphasize that the correlation signal V(z) can be different for different parts of a sample with surface features, Equation 8 is rewritten as:

$$V(x, y, z) = 4\pi AB|U|^2 \int_{bandwidth} \int_0^{\theta_0} \{\cos[2k(z + \qquad (9)$$

$$\Delta z_{sample})\cos\theta + \pi]\sin\theta\cos\theta d\theta\} k^2 F(k)dk$$

Comparing Equation 9 with Equation 1, it is clear that the auto-correlation function $\gamma(x,y,z)$ is simply:

$$\gamma(x, y, z) = 2\pi |U|^2 \int_{bandwidth} \int_0^{\theta_0} \{\cos[2k(z + \qquad (10)$$

$$\Delta z_{sample})\cos\theta + \pi]\sin\theta\cos\theta d\theta\} k^2 F(k)dk$$

In our experiments, the object is scanned axially along the z-axis in $N_{scan}$ ($N_{scan}=64$) discrete steps of size $\Delta z$. Thus, at the nth step, $z=n\Delta z$; the auto-correlation signal $\gamma(x,y,n\Delta z)$ for the pixel (x,y) on the image plane is discrete as shown in FIG. 3, which is a plot of the discrete data points of an experimental depth response for the case of broadband illumination. The object is a plane mirror. As indicated in Equation 10, there is no simple analytic expression for the correlation signal. However, the experimental data may easily be approximated by sinusoids of instantaneous frequency $\bar{\nu}$ modulated by envelopes a(z):

$$\gamma(x, y, n\Delta z) \approx a(n\Delta z + \Delta z_{sample})\cos[2\pi\nu(n\Delta z + \qquad (11)$$

$$\Delta z_{sample}) + \pi] = -a(n\Delta Z + \Delta z_{sample})\cos[2\pi\nu(n\Delta z + \Delta z_{sample})]$$

It is clear from the spectrum of the depth response (FIG. 3) that the useful information, the correlation signal $\gamma(z-\Delta z_{sample})$ (Eq. 1), is contained in just one sideband. It is thus essential to filter out the zero frequency component and one of the sidebands. By eliminating one sideband in the frequency domain, the filtered correlation signal $\gamma(x,y,n\Delta z)_{filtered}$ now has an amplitude variation like that of an exponential with an imaginary argument, or a monotonically increasing phase variation with $\Delta z_{sample}$, instead of a cosine variation with a real argument. We can thus extract the amplitude $A(n\Delta z+\Delta z_{sample})$ and the phase $2\pi\nu(n\Delta z+\Delta_{sample})$ from the filtered data:

$$\gamma(x,y,n\Delta z)_{filtered} = -a(n\Delta Z + \Delta Z_{sample})e^{-j2\lambda\bar{\nu}(n\Delta z + \Delta z_{sample})} \qquad (12)$$

We may then say that the discrete data $A(n\Delta z+\Delta z_{sample})$ is the instantaneous amplitude, or envelope, and that the rate of change of the phase of the correlation signal is the instantaneous frequency $\nu$.

Figure 6:
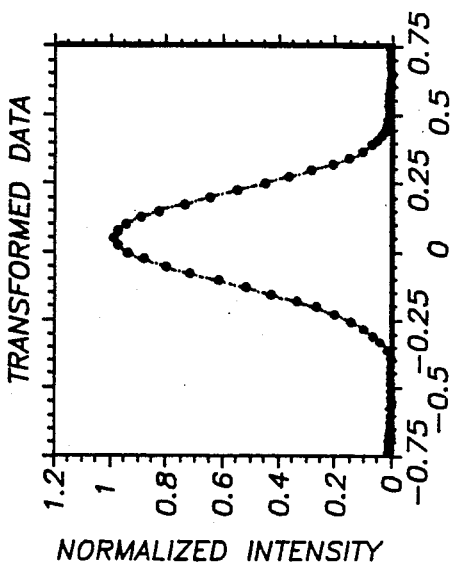
FIG. 6 shows the transformed signal of FIG. 3.
Figure 5:
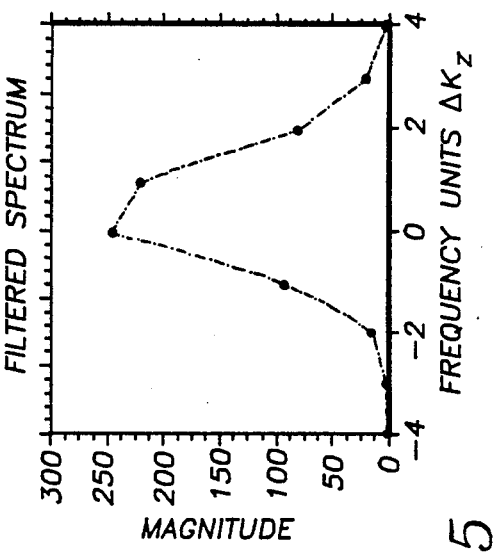
FIG. 5 shows the signal of FIG. 3 filtered and shifted in the Fourier domain.

The Fourier spectrum $\Gamma(n\Delta k_z)$ of the correlation signal consists of a zero frequency component and two spectral islands located at $\pm N_p \Delta k_z$ as shown by FIG. 4. The zero frequency component and the negative spectral island are next eliminated. As illustrated by Equation 12, the filtered signal $\Gamma(n\Delta z)_{filtered}$ has a linear dependence on $n\Delta z$, the axial location of the sample. In most situations it is desirable to eliminate the term $e^{-j2\pi\nu n\Delta z}$ which has a linear phase variation with $\Delta z$ in order to avoid the extra phase wraparounds introduced. It is well known that shifting the spectrum $\Gamma(n\Delta k_z)$ by $-\nu$ units in the frequency domain is equivalent to multiplying the output signal $\gamma(n\Delta z)_{filtered}$ by $e^{j2\pi\nu n\Delta z}$. The linear phase dependence of the output signal can thus be eliminated by centering the remaining spectral packet as shown in FIG. 5. An inverse Fourier transform then brings us the final result shown in FIG. 6. Mathematically, the filtered data $\Gamma'(n\Delta z)_{filtered}$ at the final stage is:

$$\Gamma'(n\Delta z)_{filtered} = -a(n\Delta z + \Delta z_{sample})e^{-j2\pi\bar{\nu}\Delta z_{sample}} \qquad (13)$$

An important feature of the correlation microscope is that it yields a direct measurement of phase because there is a reference present. To interpret the phase data, we first confine ourselves to opaque samples. It is apparent from Equation 13 that the measured phase $\Phi(x,y) = -2\pi\nu\Delta z_{sample}$ is a direct measure of the surface profile of the sample. Since phase can be measured to an accuracy of the order of 1 degree, it is possible to measure, by this means, changes in height to an accuracy of the order of 1/1000 th of a wavelength, or 1 nm. However, it should be pointed out that if the height variation $\Delta z_{sample}$ is more than a wavelength, the phase data Φ(x,y) suffers phase wrap-arounds and the phase image will then be hard to interpret.

Figure 15:
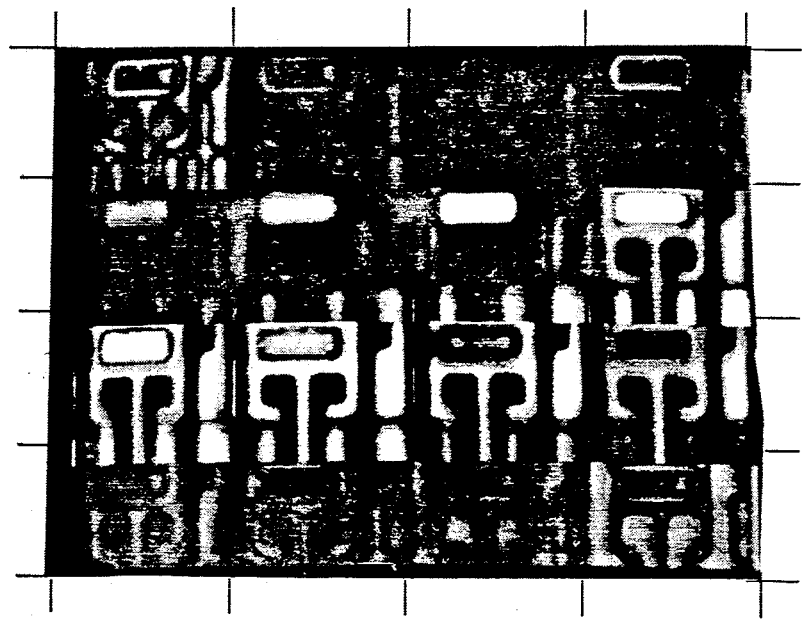
FIG. 15 shows sixteen cross-sectional images of the same integrated circuit at 16 different foci. The axial separation of each image is 0.137 μm along the z-axis. The size of each image is 16 μm square.

To demonstrate the reconstruction of two-dimensional cross-sectional images from the raw data, a silicon integrated circuit was scanned along the z-axis for a distance of 2.2 μm. Images were acquired at 64 equally spaced vertical positions of the circuit and then possessed by the Fourier transform algorithm as described. FIG. 15 shows the corresponding intensity cross-sectional images at sixteen equally-spaced vertical positions. The top left picture shows the image of our circuit when it is closest to the objective, while the bottom right picture shows the circuit when it is furthest from the objective during the scan. As we scan along the z-axis (or equivalently move across row-by-row in FIG. 15), different regions of the circuit come into focus at different axial locations. As the vertical separation between each picture is only 0.137 μm, it is clear that the Mirau Correlation Microscope has a very shallow depth of focus which enables us to image an integrated circuit layer by layer.

Figure 16:
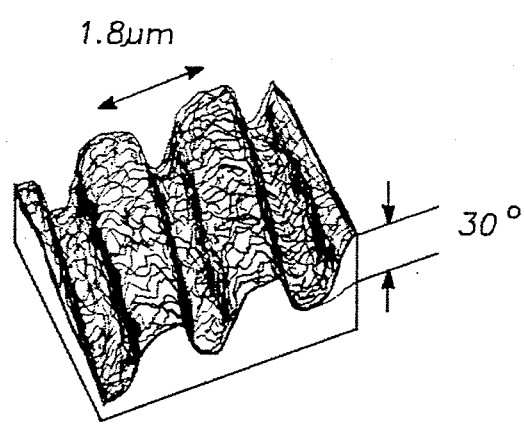
FIG. 16 shows a two-dimensional phase image of a surface acoustic wave device. The device has a spatial period of 1.8 μm and height variation of 35 nm.

Moreover, we can produce phase images with the Fourier transform algorithm. FIG. 16 shows a phase image of a surface acoustic wave device. The top and bottom of the device is clearly observed in the phase image.

Hilbert Transform

The Hilbert transform introduces a phase shift of $\pi/2$ to an input signal. For example, when $\gamma$ in Equation 11 is Hilbert transformed, the phase shifted output signal $\hat{\gamma}$ has the same envelope as $\gamma$ but its argument follows a sine variation. We can now construct the corresponding sampled analytic signal s(n) from he real signal $\gamma$ by a simple addition:

$$s(n) = \gamma + j\hat{\gamma} = -A[z_n + \Delta z_{sample}(x,y)]e^{j\Phi_n(x,y)} \quad (14)$$

Since the analytic signal s(n) is complex, aliasing due to sinusoidal variations in the interference images is removed. The envelope of the fringes $A[z_n + \Delta z_{sample}(x,y)]$ gives us the amplitude envelope image of the object (FIG. 5) while the argument $\Phi_n(x,y)$ in the exponential yields the corresponding phase image.

Figure 8:
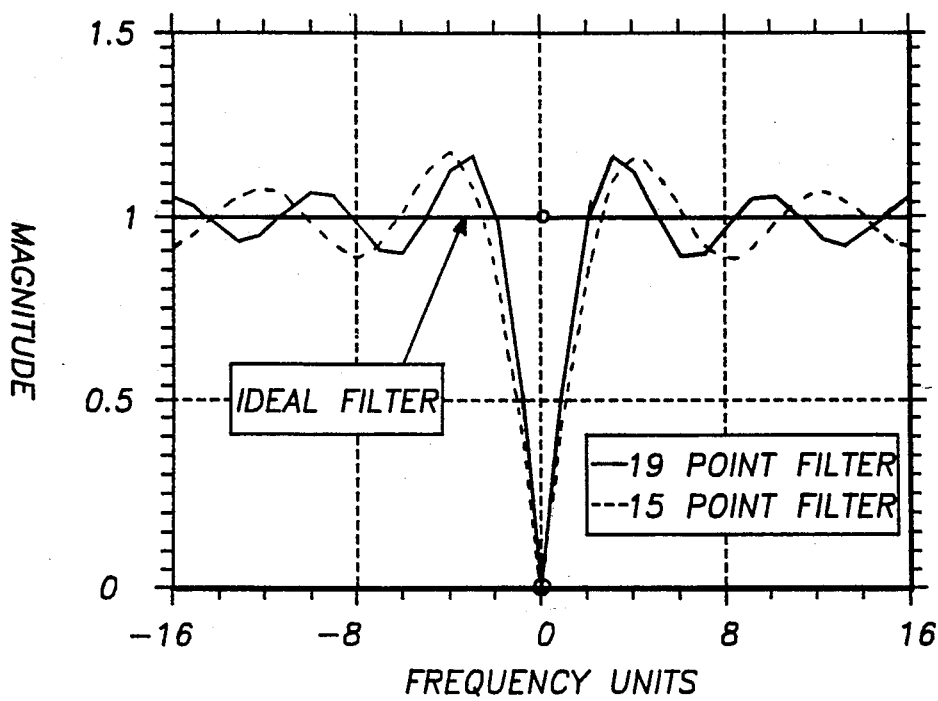
FIG. 8 shows a frequency response of finite Hilbert filters.

Before implementing the Hilbert transform, we need to consider its practicability in terms of the amount of computation involved, since we are dealing with a large amount of three-dimensional image data. It is therefore useful to consider the impulse response and the frequency response of the discrete Hilbert transform. The ideal frequency response of the Hilbert transform is plotted in FIG. 8. In practical terms, it is never possible to achieve the ideal response because an infinite number of filter elements is required to process the images along the z axis. The responses of finite length filters shown in FIG. 8 illustrate the introduction of ripples into the ideal frequency response in a practical filter of finite length. It is observed that the maximum rippling introduced by a 19-point filter is 16 percent. By choosing the sampling frequency close to the Nyquist rate, the spectrum of the cross-correlation signal can be located close to the passband center of the Hilbert response, hence minimizing the effects of the ripples. The impulse response h(n) of a 2M+1-point Hilbert transformer is given by:

$$h(n) = \begin{cases} \frac{1}{n} & \text{if } |n| \leq M \text{ and } n \text{ is odd} \\ 0 & \text{otherwise} \end{cases} \quad (15)$$

The phase shifted signal $\hat{\gamma}(n)$ is calculated by convolving h(n) with $\gamma(n)$. Therefore we write: The phase shifted signal $\hat{\gamma}(n)$ is calculated by convolving h(n) with $\gamma(n)$. Therefore we write:

$$\hat{\gamma}(n) = \sum_{m=-M}^{M} \gamma(m-n)h(m) \quad (16)$$

Since the impulse response h(n) is antisymmetric about n=0 and it is zero for even n, Equation 15 can be simplified to:

$$\hat{\gamma}(n) \sum_{\substack{m=1 \\ m \text{ odd}}}^{M} \frac{\gamma(m-n) - \gamma(m+n)}{m} \quad (17)$$

The number of nontrivial multiplications (or divisions in this case) involved in a (2M+1) point Hilbert transformer is less than M/2, which is a factor of four less than that of most other finite impulse response (FIR) digital filters, as illustrated by Equation 17. For our application, we only require an 19-point Hilbert filter, which involves just four nontrivial multiplications. Comparing with the previous Fourier transform algorithm, which requires (N/2)log$_2$N - 192 nontrivial multiplications (for N - 64), we have saved a tremendous amount of computation. In addition, the divisor m is now just a simple integer (m - 1,3,5 ... ) which makes it possible to use an 8-bit processor to do the arithmetic with reasonable accuracy. The simplicity of the filter coefficients enables us to use an 8-bit frame processor for the arithmetic, which works on a frame-by-frame basis instead of repeating the same process pixel by pixel.

Figure 9:
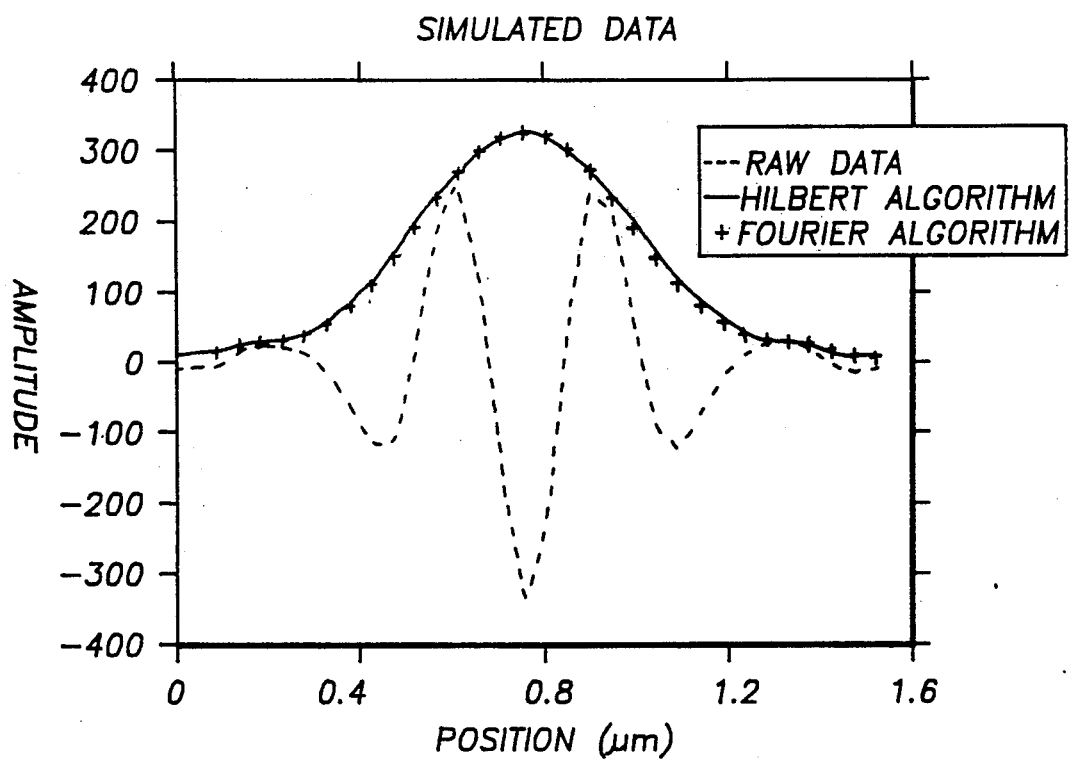
FIG. 9 shows the simulated amplitude response obtained by a Hilbert filter.

The amplitude response V(z) of a microscope is obtained by placing a plane reflector at the object plane and recording the signal amplitude as the object is being moved out of focus. In our simulation to test the Hilbert transform algorithm, we choose an 19-point Hilbert transformer and we limit ourselves to 7-bit arithmetic. FIG. 9 shows the simulated amplitude response V(z) of the unprocessed signal and that obtained by the Hilbert filter for a scan distance of 3.0 μm along the z-axis. The simulated data obtained by the Fourier transform algorithm is plotted as a series of cross. The good agreement between these two filtered responses shows clearly that a 19-point Hilbert transformer is sufficient and that an 8-bit frame processor is not going to limit the accuracy of the filter. FIG. 11 shows the experimental amplitude responses for the same scanned distance (3.0 μm) in the z-axis. Again, there is good agreement between the filtered data obtained by the Fourier transform algorithm and that by the Hilbert filter. The Hilbert filter is thus a fast alternate algorithm for extracting the correlation envelope from the interference fringes.

In our speed comparison test, we worked on a 128×128 pixel square image. The time required to process one image frame using the Hilbert transformer is 12.6 seconds, compared to 30 seconds obtained by an optimized fast Fourier transform algorithm. However, if only an intensity image is required, all the filtering steps can be performed on a low-cost, relatively slow image capture board (Data Translation DT2851). The data processing time is now reduced to 10.5 seconds. Since the image capture board is operated on a frame-by-frame basis, a 256×256 pixel square will now take approximately the same amount of processing time as a 128×128 square image. As we work with larger images, the Hilbert transform which can be implemented by frame operations will become much more efficient, compared to algorithms which have to operate on a pixel by pixel basis.

It is observed in FIG. 8 that the transfer function of the Hilbert filter has ripples which can distort our signal. The effect of these undesirable ripples can be reduced, however, if the sampling frequency is so chosen such that the signal frequency components are positioned outside the frequency range of the ripples.

In our experiments, we scanned the object axially along the z axis in N (N=64) steps of size $\Delta z$. The sampling interval was thus $\Delta z$ and the total scanned distance was $N\Delta z$. Since the input signal consisted of N impulses separated by the sampling interval $\Delta z$, its frequency spectrum was discrete and periodic, as shown in FIG. 11. From sampling theory, we know that the frequency unit $\Delta k_z = 1/N\Delta z$ and that the spectrum repeats itself every N frequency units. Assuming our signal spectrum is of bandwidth B around a carrier frequency $v_0$, the highest spatial frequency is $(v_0 + B/2)$. In order to avoid aliasing, we have to sample above the Nyquist rate, i.e.:

$$\frac{1}{\Delta z} \geq 2\left(v_0 + \frac{B}{2}\right) \quad (18)$$

The frequency response of a (2M+1) point Hilbert filter is shown in FIG. 12. The higher the order of M, the closer the practical filter will approach the ideal one. Assuming we can tolerate ripples of, say, 10 percent in the filter response, it is possible to determine the spatial frequency $v_c$ above which the maximum deviation of the practical filter from the ideal one is less than 10 percent. The value of $v_c$ depends on the order M of the filter, the higher the order M, the small is the value of $v_c$.

The signal is now positioned in the frequency domain, as shown in FIG. 13. The condition that all signal frequency components are distorted by less than 10 percent be expressed mathematically as:

$$v_0 - \frac{B}{2} \geq v_c \quad (19)$$

Figure 10:
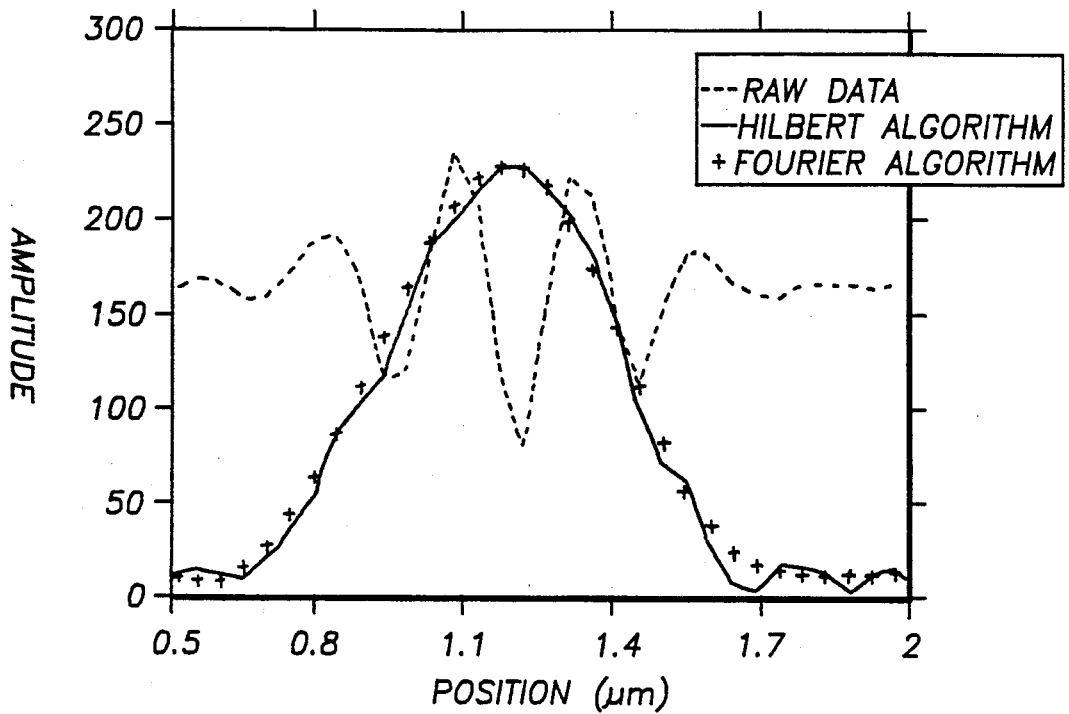
FIG. 10 shows the experimental amplitude response for the same scanned distance.
Figure 14:
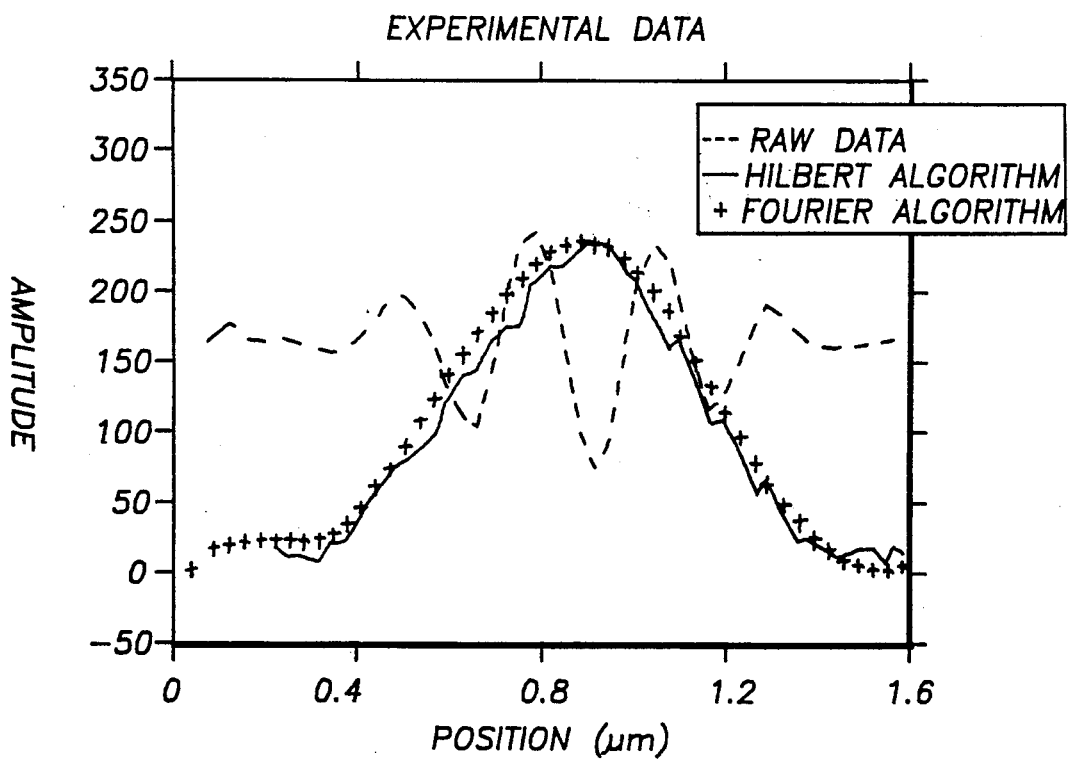
FIG. 14 shows the interference signal envelope when the scanned distance is reduced.

In our experiment with a broadband illumination source and an 0.8 numerical aperture objective, the spatial carrier frequency $v_0$ is 3.75 $\mu$m, the spatial bandwidth B of the signal is 4.5 $\mu^{-1}$ and the spatial frequency $v_c = 4\Delta k_z$ when an 18-point Hilbert filter is used. For a total scanned distance of 3.0 $\mu$m along the z axis in N=64 steps, he frequency unit $\Delta k_z$ is 0.33 $\mu m^{-1}$ and the sampling rate $(1/\Delta z)$ is 21.3 $\mu m^{-1}$. Both inequalities (8) and (9) are satisfied. The filtered data is smooth and closely resembles that obtained by the Fourier transform algorithm, as illustrated in FIG. 10. However, if we decrease the step size $\Delta z$ by reducing the total scanned distance to 2.0 $\mu$m, the inequality (19) is not satisfied, implying that the filter may introduce excessive ripples to the data. An example of such an unsatisfactory filtered data set is shown in FIG. 14, where the ripples could cause possible confusion in the examination of a complicated or multilayered integrated circuit.

The Hilbert Transform algorithm is also capable of registering phase data. It is clear from Equation 14 that the analytic signal s(n) generated from the Hilbert algorithm has both an amplitude term $g[z_n + \Delta z_{sample}(x,y)]$ and a phase term $\Phi_n(x,y)$. The argument $\Phi_n(x,y)$ yields the phase data. Comparing Equation 14 with Equation 12, the argument $\Phi_n(x,y)$ corresponds to $2\pi\bar{v}(n\Delta z + \Delta z_{sample})$. Thus, the height variation of a sample $\Delta z_{sample}$ is recorded but there is an extra linear phase term $2\pi\bar{v}\, n\Delta z$ contained in $\Phi_n(x,y)$. In order to determine the height information of a sample from the phase data $\Phi_n(x,y)$ the linear phase term $2\pi\bar{v}\, n\Delta z$ has to be subtracted.

What is claimed is:

1. The method of providing images of a surface of a sample using a correlation microscope comprising the steps of
    at each of a plurality of x,y locations of said sample, focusing an illumination beam at a multiplicity of distinct z positions ranging from a position above the sample to a position below the sample;
    generating interference signals for each x,y,z location at which said illumination beam is focused by said focusing step;
    storing the interference signals for each of said x,y,z locations as the object is moved in the z plane, and
    transforming the stored interference signals at each x,y location in the z direction to obtain an intensity envelope of interfering signals in the z direction for each x,y location.

2. The method as in claim 1 wherein said step of transforming the signals at each location comprises a Fourier transform.

3. The method as in claim 1 wherein the step of transforming the signals at each location comprises a Hilbert transform.

4. The method as in claims 1, 2 or 3 in which the transformed signals include phase information for use in surface profiling, edge detection and feature recognition.

5. The method of providing images of a surface of a sample using a correlation microscope comprising the steps of
    at each of a plurality of x,y locations of said sample, focusing an illumination beam at a multiplicity of distinct z positions ranging from a position above the sample to a position below the sample;
    generating at an image plane interference signals for each x,y,z location at which said illumination beam is focused by said focusing step;
    digitizing the signals at each of said x,y,z locations and storing the digital signals,
    transforming the digital signals at each x,y location in the z direction to obtain an intensity envelope of the interfering signals in the z direction for each x,y location, and
    processing said intensity envelopes to provide a selected image of the surface.

6. The method of claim 5 in which the signals are sequentially transformed for each x,y location.

7. The method as in claim 6 in which the signals are transformed by a Fourier transform in the z direction, digital filtering in the z spatial domain and inverse transforming along the z direction.

8. The method as in claim 5 in which the signals for all x,y locations are transformed in parallel.

9. The method as in claim 8 in which the transform is a Hilbert transform.

* * * * *